US010866777B2

(12) United States Patent
Itakura et al.

(10) Patent No.: US 10,866,777 B2
(45) Date of Patent: Dec. 15, 2020

(54) INFORMATION PROCESSING APPARATUS, INFORMATION PROCESSING SYSTEM AND INFORMATION PROCESSING METHOD

(71) Applicant: FUJITSU LIMITED, Kawasaki (JP)

(72) Inventors: Kota Itakura, Kawasaki (JP); Junichi Yura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/575,335

(22) Filed: Sep. 18, 2019

(65) Prior Publication Data

US 2020/0012471 A1 Jan. 9, 2020

Related U.S. Application Data

(63) Continuation of application No. PCT/JP2018/006033, filed on Feb. 20, 2018.

(30) Foreign Application Priority Data

Mar. 21, 2017 (JP) ................. 2017-055000

(51) Int. Cl.
*G06F 3/14* (2006.01)
*G06F 3/01* (2006.01)

(52) U.S. Cl.
CPC ............ *G06F 3/1423* (2013.01); *G06F 3/012* (2013.01); *G06F 3/013* (2013.01)

(58) Field of Classification Search
CPC ........ G06F 3/1423; G06F 3/012; G06F 3/013; G06F 3/0484; G09G 5/14; G09G 2340/0492
See application file for complete search history.

(56) References Cited

U.S. PATENT DOCUMENTS

2004/0165010 A1  8/2004  Robertson et al.
2010/0129053 A1  5/2010  Ito
(Continued)

FOREIGN PATENT DOCUMENTS

JP  2004-259260 A  9/2004
JP  2010-123081 A  6/2010
(Continued)

OTHER PUBLICATIONS

Junya Kani et al., "Evaluation on Collaborative Editing System Robust to Communication Load", IEICE Technical Report, vol. 116, No. 509, pp. 51-58, Mar. 2017, Information Processing Society of Japan (9 pages) (Cited in ISR).

(Continued)

*Primary Examiner* — Robert J Michaud
(74) *Attorney, Agent, or Firm* — Fujitsu Patent Center

(57) ABSTRACT

An information processing apparatus includes: a memory; and a processor coupled to the memory and configured to: display content on a basis of information on the content retained in the memory of the information processing apparatus; determine a possibility of transfer from the information processing apparatus to another apparatus for each piece of the content which is displayed at the information processing apparatus, with reference to the information retained in the memory; and transfer the information on the content to the another apparatus that is a transfer destination, when determining that the possibility of transfer exists.

6 Claims, 20 Drawing Sheets

(56) References Cited

U.S. PATENT DOCUMENTS

| | | |
|---|---|---|
| 2014/0089812 A1 | 3/2014 | Matsui et al. |
| 2015/0077365 A1 | 3/2015 | Sasaki |
| 2015/0169205 A1* | 6/2015 | Yajima ................ G06F 3/04847 715/799 |
| 2016/0055826 A1* | 2/2016 | Abe ...................... G06F 3/1454 345/2.3 |
| 2017/0244930 A1* | 8/2017 | Faulkner ................ H04N 7/147 |

FOREIGN PATENT DOCUMENTS

| | | |
|---|---|---|
| JP | 2014-067312 A | 4/2014 |
| JP | 2015-056172 A | 3/2015 |
| JP | 2016-173828 A | 9/2016 |
| WO | 2009/128148 A1 | 10/2009 |

OTHER PUBLICATIONS

Sebastian Boring, et al., "Touch Projector: Mobile Interaction through Video", Proceedings of the SIGCHI Conference on Human Factors in Computing Systems, pp. 2287-2296, Apr. 10-15, 2010, Atlanta GA, USA (10 pages) (Cited in ISR).

International Search Report and Written Opinion of the International Searching Authority (Form PCT/ISA/210, 220, and 237), mailed in connection with PCT/JP2018/006033 and dated Apr. 24, 2018 (10 pages).

EESR—Extended European Search Report dated Dec. 20, 2019 for corresponding European Application No. 18770532.2.

\* cited by examiner

| DEVICE ID | LOCATION | ORIENTATION | OTHERS | ... |
|---|---|---|---|---|
| display1 | x=500, y=300, z=50 | x=0, y=0, z=1 | WIDTH:300, HIGHT:200, ROTATION:0 | ... |
| camera | x=50, y=200, z=400 | x=0.5, y=0, z=0.2 |  | ... |
| VIDEO CONFERENCE display | x=0, y=200, z=200 | x=1, y=0, z=0 | WIDTH:300, HIGHT:200, ROTATION:0 | ... |

|  | display2 | display3 | ... |
|---|---|---|---|
| contents1 | UNTRANSFERRED | UNTRANSFERRED | ... |
| contents2 | ALREADY TRANSFERRED | UNTRANSFERRED | ... |
| contents4 | UNTRANSFERRED | UNTRANSFERRED | ... |
| contents5 | ALREADY TRANSFERRED | ALREADY TRANSFERRED | ... |
| ... | ... | ... | ... |

119

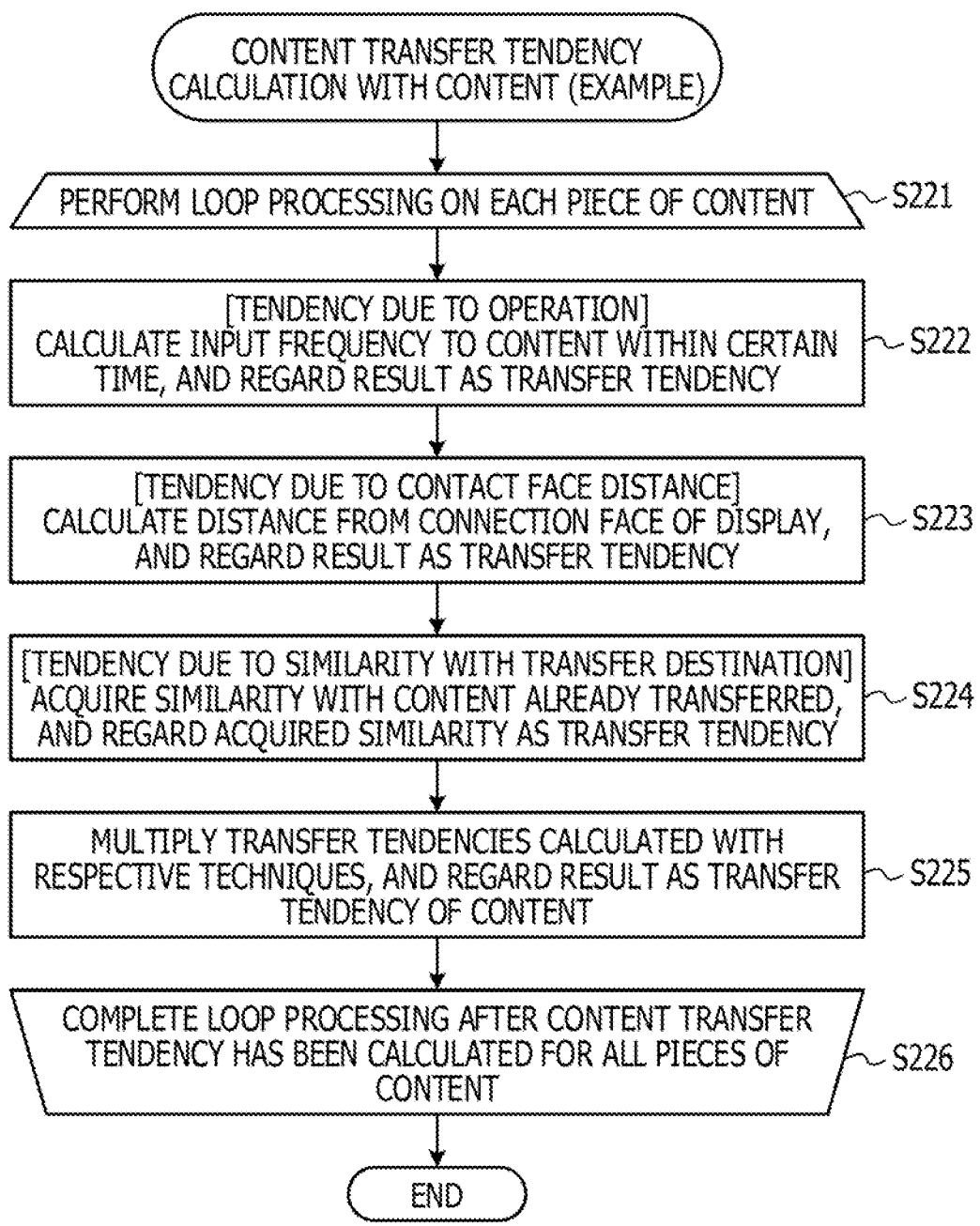

INFORMATION PROCESSING APPARATUS, INFORMATION PROCESSING SYSTEM AND INFORMATION PROCESSING METHOD

CROSS-REFERENCE TO RELATED APPLICATION

This application is a continuation application of International Application PCT/JP2018/006033 filed on Feb. 20, 2018 and designated the U.S., the entire contents of which are incorporated herein by reference. The International Application PCT/JP2018/006033 is based upon and claims the benefit of priority of the prior Japanese Patent Application No. 2017-055000, filed on Mar. 21, 2017, the entire contents of which are incorporated herein by reference.

FIELD

The embodiment relates to an information processing apparatus, an information processing system, and an information processing method.

BACKGROUND

There has been proposed a technology of projecting content onto a desk or wall of a conference room to support collaborative work (user interface (UI) technology of digitizing the entirety of the room) (Press Release: http://pr.fujitsu.com/jp/news/2015/07/27.html).

Related art is disclosed in Japanese Laid-open Patent Publication No. 2015-56172.

SUMMARY

According to an aspect of the embodiments, an information processing apparatus includes: a memory; and a processor coupled to the memory and configured to: display content on a basis of information on the content retained in the memory of the information processing apparatus; determine a possibility of transfer from the information processing apparatus to another apparatus for each piece of the content which is displayed at the information processing apparatus, with reference to the information retained in the memory; and transfer the information on the content to the another apparatus that is a transfer destination, when determining that the possibility of transfer exists.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a table of an exemplary data structure of transfer status information.

FIG. 19 is a flowchart of exemplary processing of content transfer tendency calculation with the content.

DESCRIPTION OF EMBODIMENTS

Figure 1:
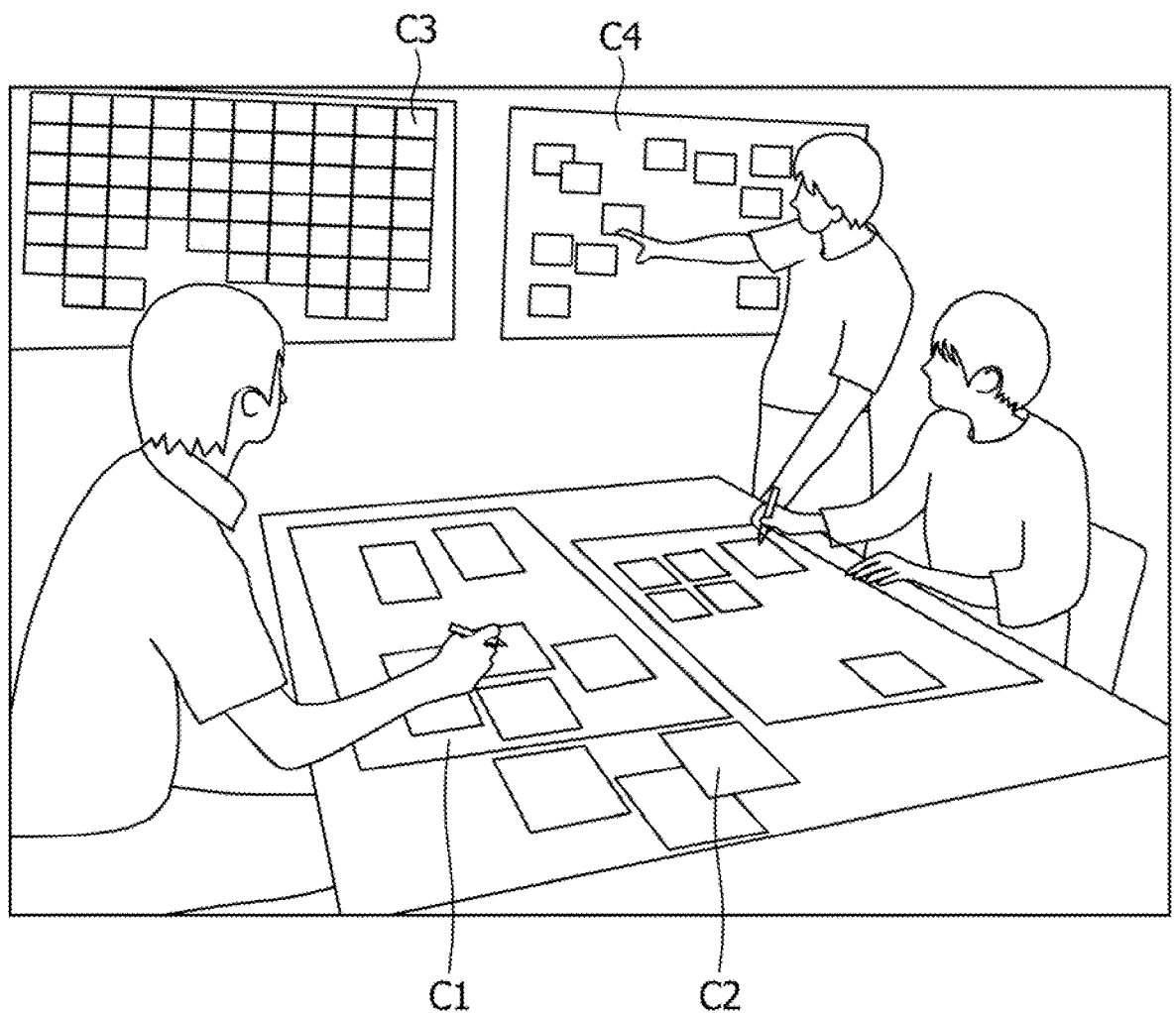
FIG. 1 is an illustration of an exemplary usage of an UI technology of digitizing the entirety of a room.

FIG. 1 illustrates an exemplary usage of the above technology. Content C1 as notebook applications for individual work and content C2 as digital sticky notes are displayed (projected) on a desk, and content C3 as digital prompt cards and content C4 as a shared notecard application are displayed on a wall. The content C2 as digital sticky notes, the content C3 as the digital prompt cards, and the like are movable between screens of different displays by, for example, a swipe operation with a finger of the user, and disposed in a related theme area or disposed in a brainstorming requirement area in the process of collaborative work.

Figure 2:
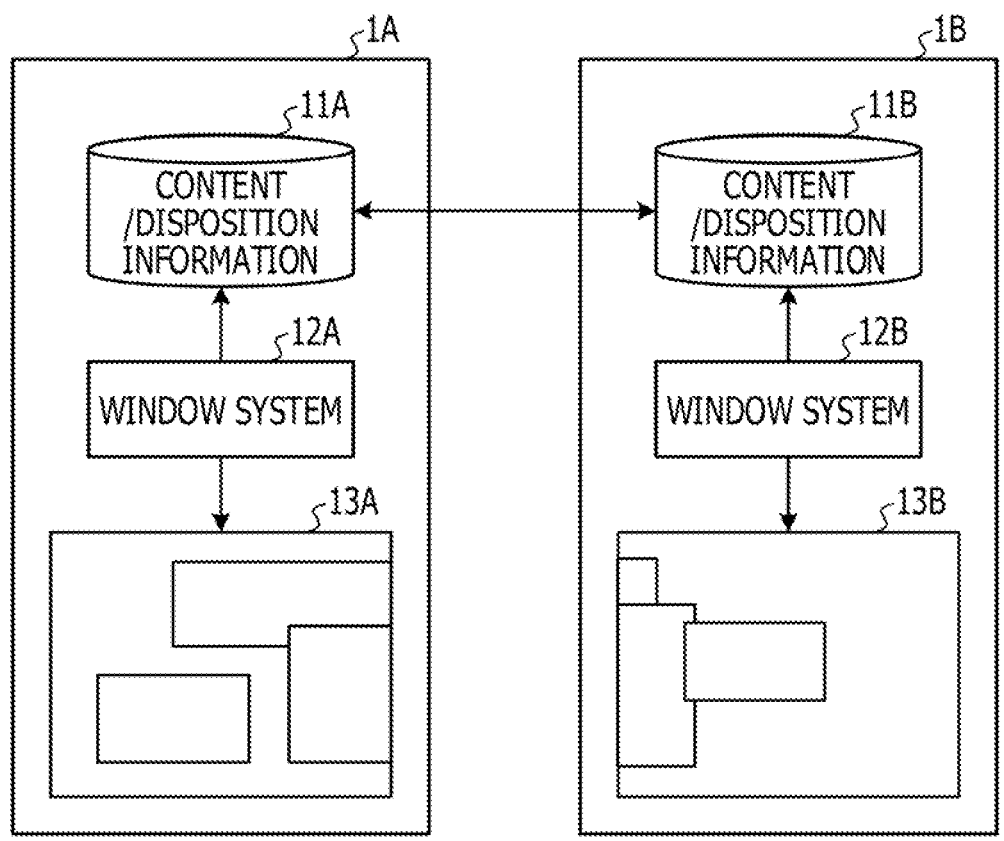
FIG. 2 is a diagram of an exemplary schematic configuration of the UI technology.

FIG. 2 illustrates an exemplary schematic configuration of the above technology, and illustrates, for example, a case where two information processing apparatuses 1A, 1B are provided in a local environment such as a conference room. The information processing apparatus 1A includes: content/disposition information 11A; a window system 12A; and a display 13A, and the information processing apparatus 18 includes: content/disposition information 11B, a window system 12B, and a display 13B, respectively. The respective screen areas of the information processing apparatuses 1A, 1B are set to make connection mutually. In the illustrated example, the right end of the screen of the display 13A is in connection with the left end of the screen of the display 13B. The information processing apparatuses 1A, 1B share the content/disposition information 11A, 11B to draw content in the screen with which the information processing apparatuses 1A or 1B is involved (for content across the screens, the information processing apparatus 1A, 18 are in charge of the content), so that display of a linked screen is achieved.

A panel system with a plurality of displays arranged that prevents a delay in display of a drawn object across the plurality of displays may be provided.

Figure 3:
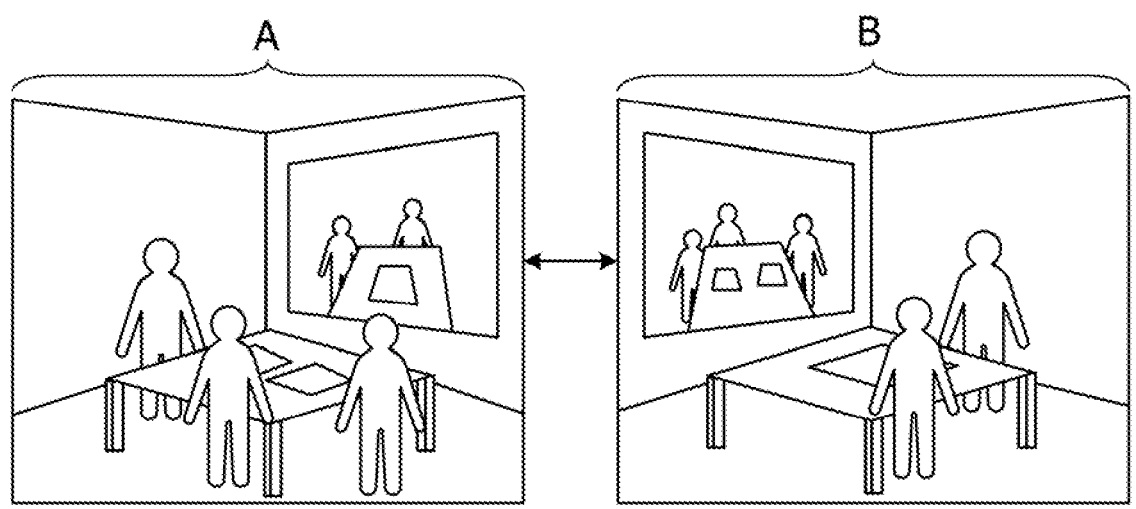
FIG. 3 is an illustration of an assumed usage scene in connection of screens between remote locations.

FIGS. 1 and 2 illustrate the case of the screens with the plurality of displays linked in the local environment. However, it is also assumed that screens included in a plurality of displays between remote locations are used by sharing of content/disposition information through a network. FIG. 3 illustrates the assumed usage scene, and in each of conference rooms A, B located at mutually remote places, the conference room of the other party can be verified on a video conference screen displayed on a wall. Furthermore, one end of the screen on the desk of each conference room is linked to one end of the screen on the desk of the other party, so that content is movable.

Figure 4:
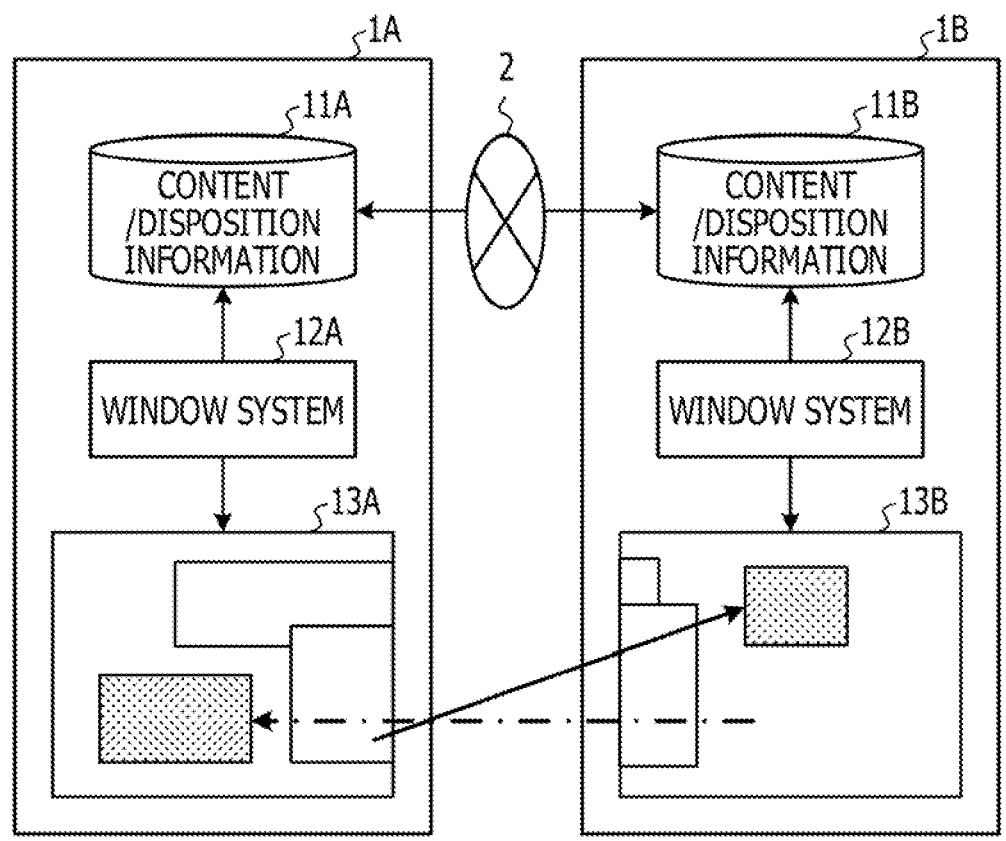
FIG. 4 is a diagram of an exemplary schematic configuration of an UI technology.

FIG. 4 illustrates an exemplary schematic configuration in the above assumed case. In FIG. 4, two information processing apparatuses 1A, 1B are provided in the remote conference rooms A, B, respectively. The information processing apparatus 1A includes: content/disposition information 11A; a window system 12A; and a display 13A, and the information processing apparatus 1B includes: a content/disposition information 11B; a window system 12B; and a display 13B, respectively. The content/disposition information 11A of the information processing apparatus 1A and the content/disposition information 11B of the information processing apparatus 1B are shared through a network 2 such as the Internet.

Here, for sharing of all pieces of content generated in each conference room and pieces of location information on the content, processing and communication is time-consuming and unrealistic. Furthermore, a technique may be considered in which information is transferred only when the location of content shifts to the other party side; however, in this case, display of the content is kept waiting until the information is transferred, so that the operability lowers. Note that a similar problem may occur in a case where communication environment is insufficient even in a short distance, not only between remote locations.

Therefore, in one aspect, the operability of content movement may be improved in a case where a plurality of screens under management of a plurality of apparatuses forms a single logical screen.

Hereinafter, a preferred embodiment of the present invention will be described with reference to the drawings.

<Configuration>

Figure 5:
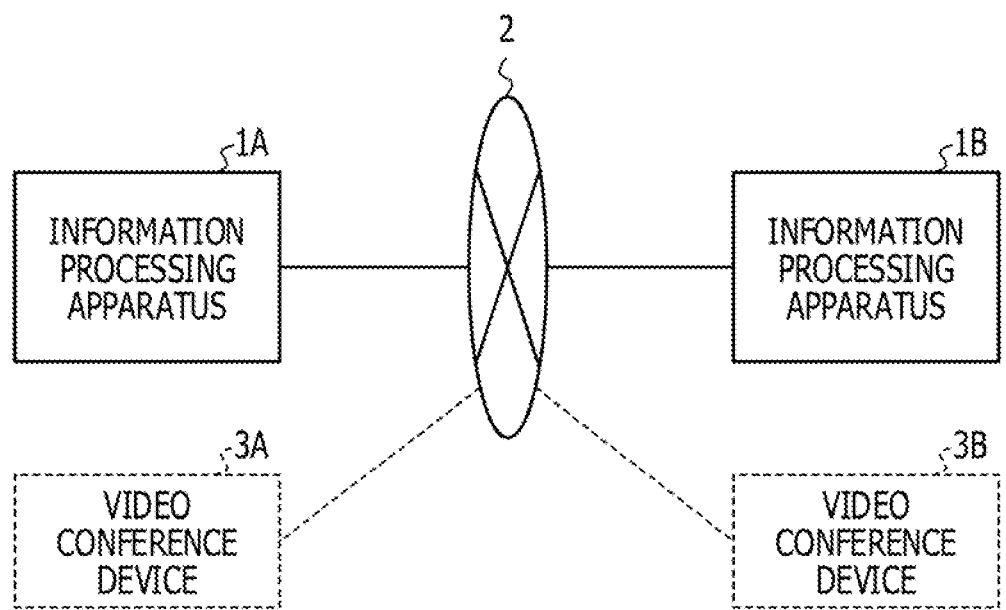
FIG. 5 is a diagram of an exemplary configuration of a system according to an embodiment.

FIG. 5 is a diagram of an exemplary configuration of a system according to the embodiment. In FIG. 5, information processing apparatuses 1A, 1B each having a function of screen input/output (operation input to a screen and display on the screen) and a function of shooting a user, and video conference devices 3A, 3B are provided, in mutually remote conference rooms. Then, the information processing apparatuses 1A, 1B and the video conference devices 3A, 3B are mutually communicably coupled through a network 2 such as the Internet. Note that the two information processing apparatuses 1A, 1B are illustrated; however, three or more information processing apparatuses may be coupled. Furthermore, the video conference devices 3A, 3B may be built in the information processing apparatuses 1A, 1B as one function of the information processing apparatuses 1A, 1B, respectively.

Figure 6:
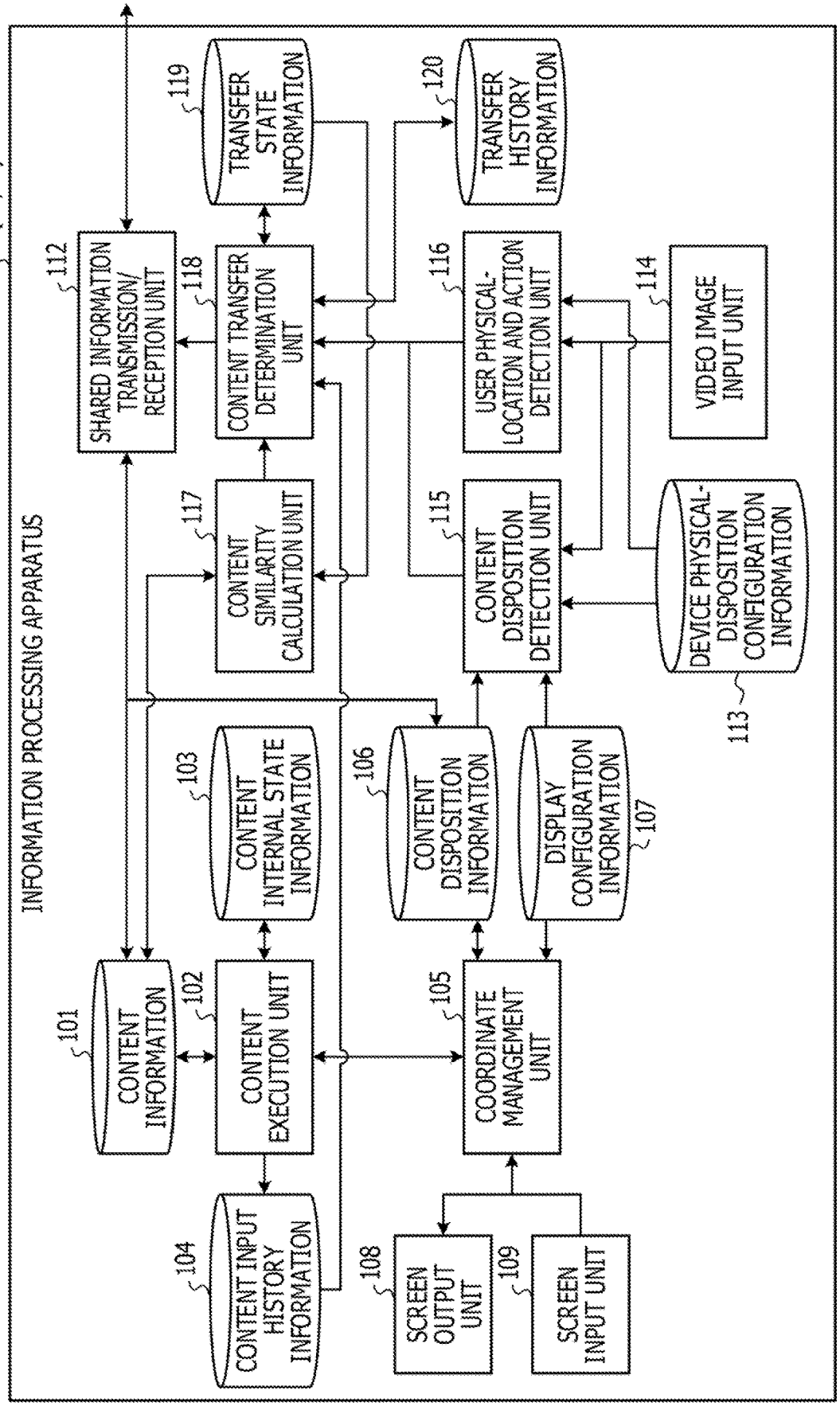
FIG. 6 is a diagram of an exemplary functional configuration of an information processing apparatus.

FIG. 6 is a diagram an exemplary of functional configuration of the information processing apparatus 1 (1A, 1B). In FIG. 6, the information processing apparatus 1 includes: content information 101; a content execution unit 102; content internal state information 103; and content input history information 104. Furthermore, the information processing apparatus 1 includes: a coordinate management unit 105; content disposition information 106; display configuration information 107; a screen output unit 108; and a screen input unit 109.

Furthermore, the information processing apparatus 1 includes: a shared information transmission/reception unit 112; a device physical-disposition configuration information 113; a video image input unit 114; a content disposition detection unit 115; a user physical-location and action detection unit 116; and a content similarity calculation unit 117. Furthermore, the information processing apparatus 1 includes: a content transfer determination unit 118; transfer status information 119; and transfer history information 120.

Figure 7:
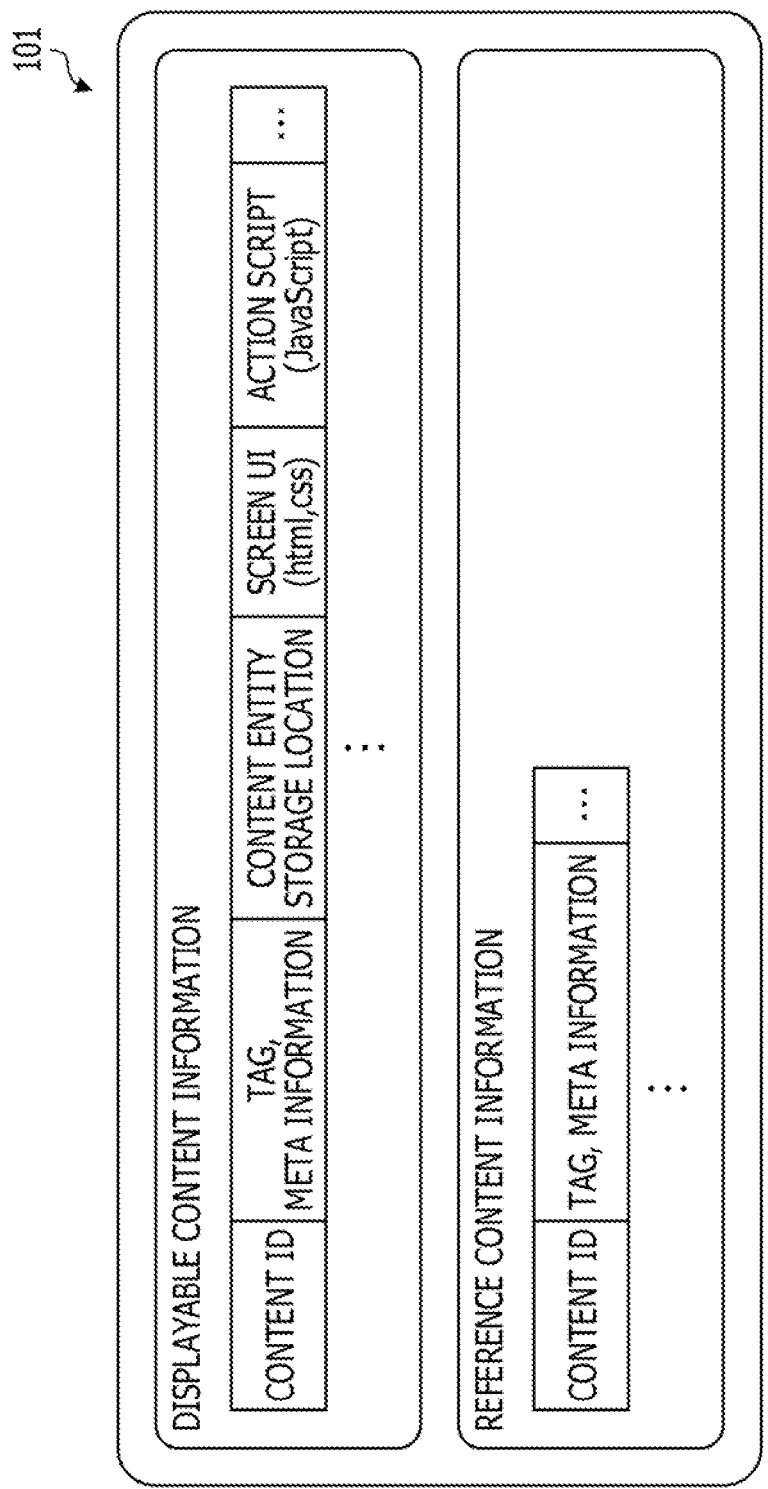
FIG. 7 is a depiction of an exemplary data structure of content information.

For example, as depicted in FIG. 7, the content information 101 includes displayable content information on content immediately displayable at a first information processing apparatus, and reference content information for calculating a content transfer tendency. The displayable content information also includes information on content transferred from a second information processing apparatus. It is assumed that content originally existing in the first information processing apparatus remains in the displayable content information even though the content has been transferred to the second information processing apparatus. The reference content information is to be used for calculating the content transfer tendency. The reference content information is part of information on content which is not retained by the first information processing apparatus and is retained by the second information processing apparatus.

The displayable content information contains items such as "content ID", "tag, meta information", "content entity storage location", "screen UI", and "action script". The "content ID" Indicates information for identifying content. The "tag, meta information" indicates information that dearly represents features of the content, such as the type of content (example: "image/png" (image in png format)). The "content entity storage location" indicates a uniform resource Identifier (URI) or a file path in which the entity of the content such as an image or text is stored (example: "./contentsresouce1.jpg"). The "screen UI" indicates a user interface that the content itself possesses, and is described by, for example, hypertext markup language (html) or cascading style sheets (css). The "action script" is to be used in the "screen UI" and described by Javascript or the like. The reference content information contains items such as "content ID" and "tag, meta information" and does not include information on, for example, an entity of content or a screen UI.

Figure 8:
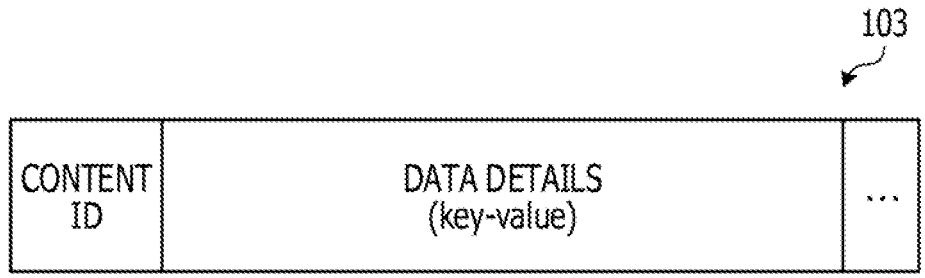
FIG. 8 is a depiction of an exemplary data structure of content internal state information.

Referring back to FIG. 6, the content execution unit 102 has a function of executing content to be displayed among pieces of displayable content information retained in the content information 101 and generating a screen of the content. The content execution unit 102 has, for example, a browser function, and executes the screen UI (FIG. 7) described by html or the like to generate the screen of the content. Furthermore, the content execution unit 102 records a state of the content resulting from the execution of the content, in the content internal state information 103, and records input history by the user for the content, in the content input history information 104. The content internal state information 103 contains items such as "content ID" and "data details" as depicted in FIG. 8. The "data details" is recorded, for example, in key-value format. Note that the content internal state information 103 may also be retained as part of the content information 101.

Figure 9:
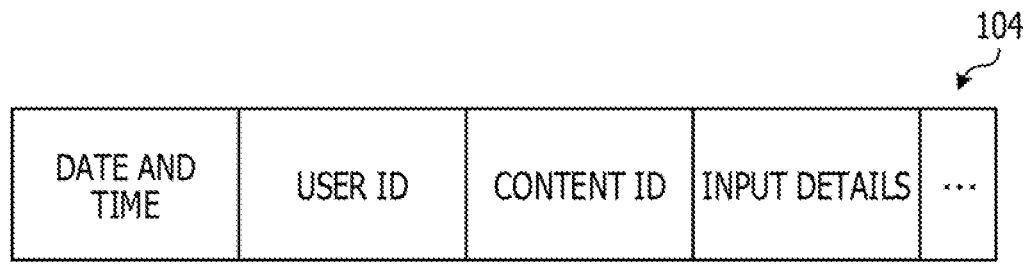
FIG. 9 is a depiction of an exemplary data structure of content input history information.

For example, as depicted in FIG. 9, the content input history information 104 contains items such as "date and time", "user ID", "content ID", and "input details". The "date and time" indicates information on date and time at the performance of an input operation. The "user ID" indicates information for identifying a user who has performed the input operation. The "content ID" indicates information for identifying content that is the target input operation. The "input details" indicates information on the details or overview of the input.

Figure 10:
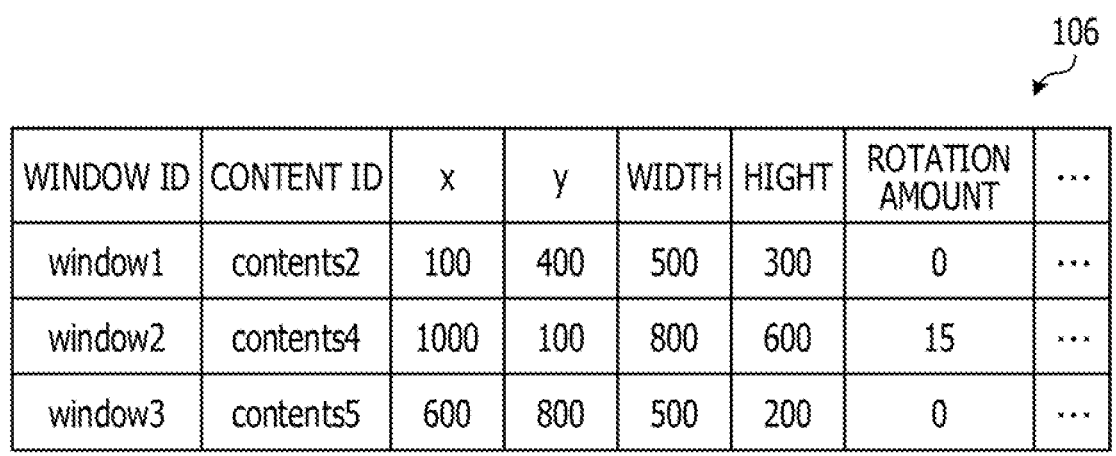
FIG. 10 is a table of an exemplary data structure of content disposition information.

Referring back to FIG. 6, the coordinate management unit 105 has a function of managing coordinates on a display that displays the screen of the content generated by the content execution unit 102, in accordance with the initial location, and the subsequent moving operation by the user, and retaining the coordinates of the content in the content disposition information 106. At this time, movement beyond the boundary of the display is grasped with reference to the display configuration information 107. For example, as indicated in FIG. 10, the content disposition information 106 contains items such as "window ID", "content ID", "x", "y", "width", "height", and "rotation amount" for each display. The "window ID" indicates information for identifying a window in which content is displayed. The "content ID" indicates information for identifying the content displayed in the window. The "x" and the "y" indicate the x coordinate and the y coordinate of the representative point (e.g., upper-left corner point) of the window, respectively. The "width" indicates size in the width direction of the window. The "height" indicates size in the height direction of the window. The "rotation amount" Indicates a rotation angle applied to the window. Note that values specifically indicated in FIG. 10 correspond to a case where windows are disposed as in FIG. 11B.

Figure 11A:
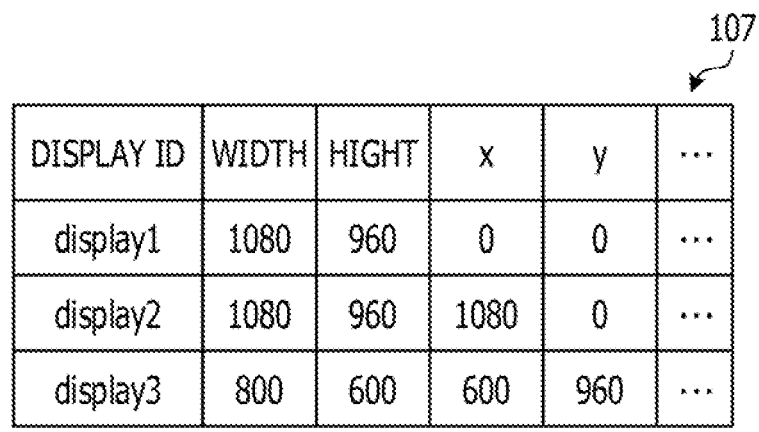
FIGS. 11A and 11B represent a table and an illustration of an exemplary data structure of display configuration information.
Figure 11B:
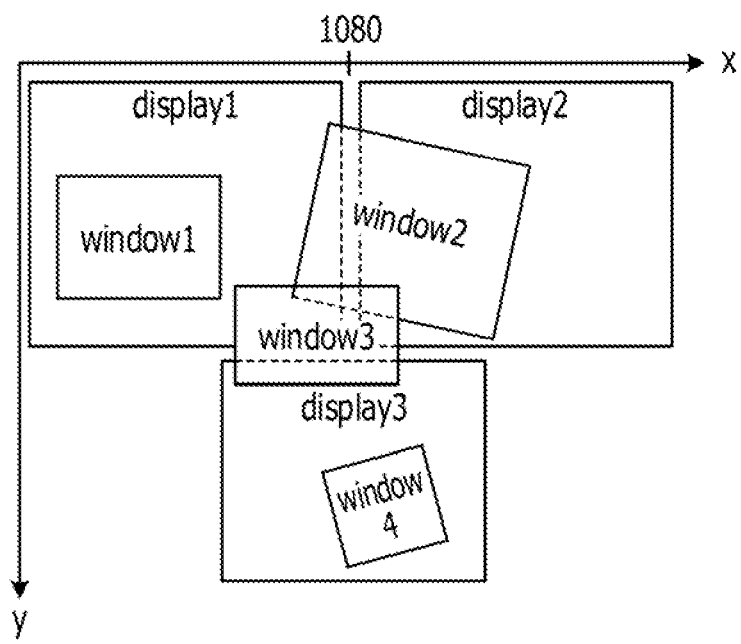

The display configuration information 107 contains items such as "display ID", "width", "height", "x", and "y" as indicated in FIG. 11A, for example. The "display ID" indicates information for identifying a display. The "width" indicates size in the width direction of the display. The "height" indicates size in the height direction of the display. The "x" and the "y" indicate the x coordinate and the y coordinate of the representative point (e.g., upper-left corner point) of the display. Note that in a case where a single information processing apparatus is allowed to include a plurality of displays, an item "apparatus ID" for identifying the information processing apparatus to which the displays belongs is added. Furthermore, values specifically indicated in FIG. 11A correspond to a case where displays are disposed as illustrated in FIG. 1B.

Referring back to FIG. 6, the screen output unit 108 has a function of displaying the content generated by the content execution unit 102 on the coordinates managed by the coordinate management unit 105.

The screen input unit 109 has a function of inputting an operation to a screen by the user. The user's operation is also performed with a keyboard, a mouse, or the like, in addition to use of a finger or a pen.

The shared information transmission/reception unit 112 has a function of transmitting information on content to and receiving information on content from the shared information transmission/reception unit of a different information processing apparatus. For the transfer side, the shared information transmission/reception unit 112 transfers information on the corresponding content from the content information 101 and the content disposition information 106, to the information processing apparatus that is a transfer destination. For the transfer destination side, the shared information transmission/reception unit 112 retains the received information on the content, in the content information 101 and the content disposition information 106.

Figures 12A, 12B:
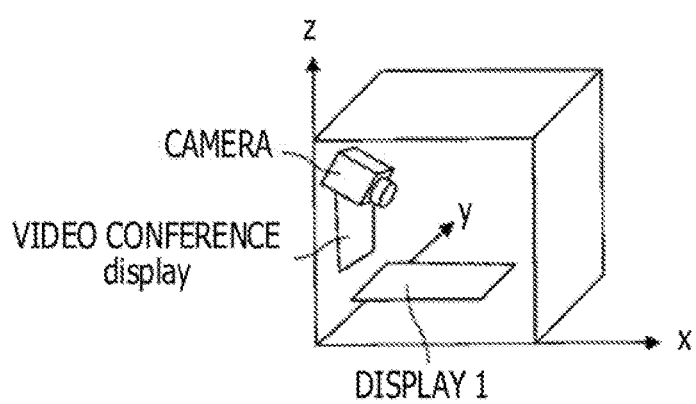
FIGS. 12A and 12B represent a table and an illustration of an exemplary data structure of device physical-disposition configuration information.

The device physical-disposition configuration information 113 contains items such as "device ID", "location", "orientation", and "others", as indicated in FIG. 12A, for example. The "device ID" indicates information for identifying a device such as a display and a camera. The "location" indicates information representing the physical three-dimensional location of the representative point of the device. The "orientation" indicates information representing the physical three-dimensional orientation of the device. The "others" indicates information representing, for example, the width, height, and rotation of the device. Note that values specifically indicated in FIG. 12A correspond to a case where a display and a camera are disposed as illustrated in FIG. 12B.

Referring back to FIG. 6, the video image input unit 114 has a function of inputting a video image from a camera that shoots a user.

The content disposition detection unit 115 has a function of detecting the disposition of content, such as the distance between the content and the user, and the respective orientations of the content and the user, from the content disposition information 106, the display configuration information 107, the device physical-disposition configuration information 113, and the video image from the camera by the video image input unit 114. Furthermore, the content disposition detection unit 115 also transmits information on the content disposition information 106 and the display configuration information 107 to the content transfer determination unit 118.

The user physical-location and action detection unit 116 has a function of detecting the location of the user and the direction of the user's line of sight from the video image captured by a camera, with use of, for example, a technology of tracking the entirety or the head of a person, on the basis of the device physical-disposition configuration information 113 and the video image input by the video image input unit 114

The content similarity calculation unit 117 has a function of calculating the similarity between content to be displayed at the first information processing apparatus and content on the second information processing apparatus (content that originally exists on the second information processing apparatus and content that has been transferred from the first information processing apparatus), with reference to, for example, tag/meta information in the content information 101.

The content transfer determination unit 118 has a function of calculating a content transfer tendency that indicates the possibility of transfer from the first information processing apparatus to the second information processing apparatus for each content, on the basis of various types of information that can be acquired in the first information processing apparatus, and determining whether the content is to be transferred in advance, on the basis of the content transfer tendency. Furthermore, the content transfer determination unit 118 also has a function of transferring information on content that has been actually moved by an operation of the user. In a case where the content transfer determination unit 118 determines that the content is to be transferred, the content transfer determination unit 118 requests transfer of the content to the shared information transmission/reception unit 112, records the transfer status in the transfer status information 119, and records the transfer history in the transfer history information 120. For example, as indicated in FIG. 13, the transfer status information 119 records, for each display, a transfer status of untransferred or already transferred for a combination of a content ID and a different display.

Figure 14:
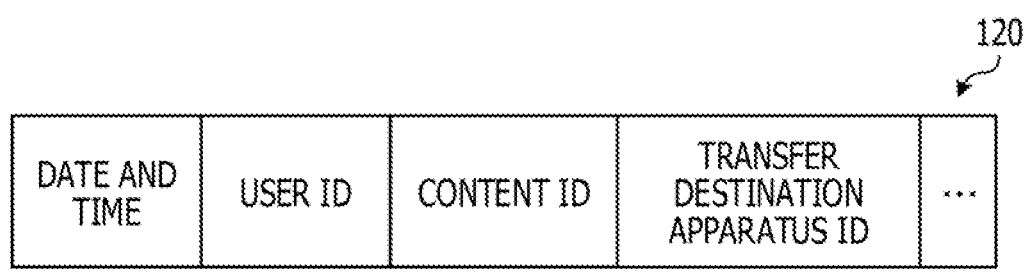
FIG. 14 is a depiction of an exemplary data structure of transfer history information.

The transfer history information 120 contains items such as "date and time", "user ID", "content ID", "transfer destination apparatus ID", as depicted in FIG. 14. The "date and time" indicates information that represents a date and time at the performance of transfer. The "user ID" indicates information for identifying a user who has performed a content moving operation that has caused the transfer. The "content ID" indicates information for identifying the transferred content. The "transfer destination apparatus ID" indicates information for identifying an information processing apparatus that is a transfer destination.

Referring back to FIG. 6, the content transfer determination unit 118 calculates a transfer tendency for each of viewpoints such as described below, calculates a content transfer tendency for each type of content from the individual transfer tendency, and determines the content to be transferred in a case where the result of the calculation exceeds a predetermined threshold, for example.

Transfer tendency due to user and content
Transfer tendency due to user's action
Intensity of movement of face or line of sight (as the movement is larger, preparation for transfer is made more and the transfer tendency is higher)
Frequency of viewing of the screen of the other party at a video conference (as the screen is viewed more, the transfer tendency is higher)
Frequency of performing transfer operation in the past (transfer action is biased to a specific user)
Transfer tendency due to relative relationship between user and content
Distance between user and content (content closer to the user is easier to be transferred)
Matching degree in orientation between user and content (when the orientations matches, the content is easier to be transferred)
Frequency of viewing by user (viewed content is easier to be transferred)
Transfer tendency due to content
Transfer tendency due to location of content
Distance between content and screen connection side (content closer to the connection side is easier to be transferred)
Transfer tendency due to details of content
Similarity with different content that has been transferred (content similar to the transferred content is easier to be transferred)
Similarity with different content of transfer destination (content similar to the content of the transfer destination is easier to be transferred for sharing information)
Frequency of inputting details (content that is input with high frequency is easier to be transferred)

Figure 15:
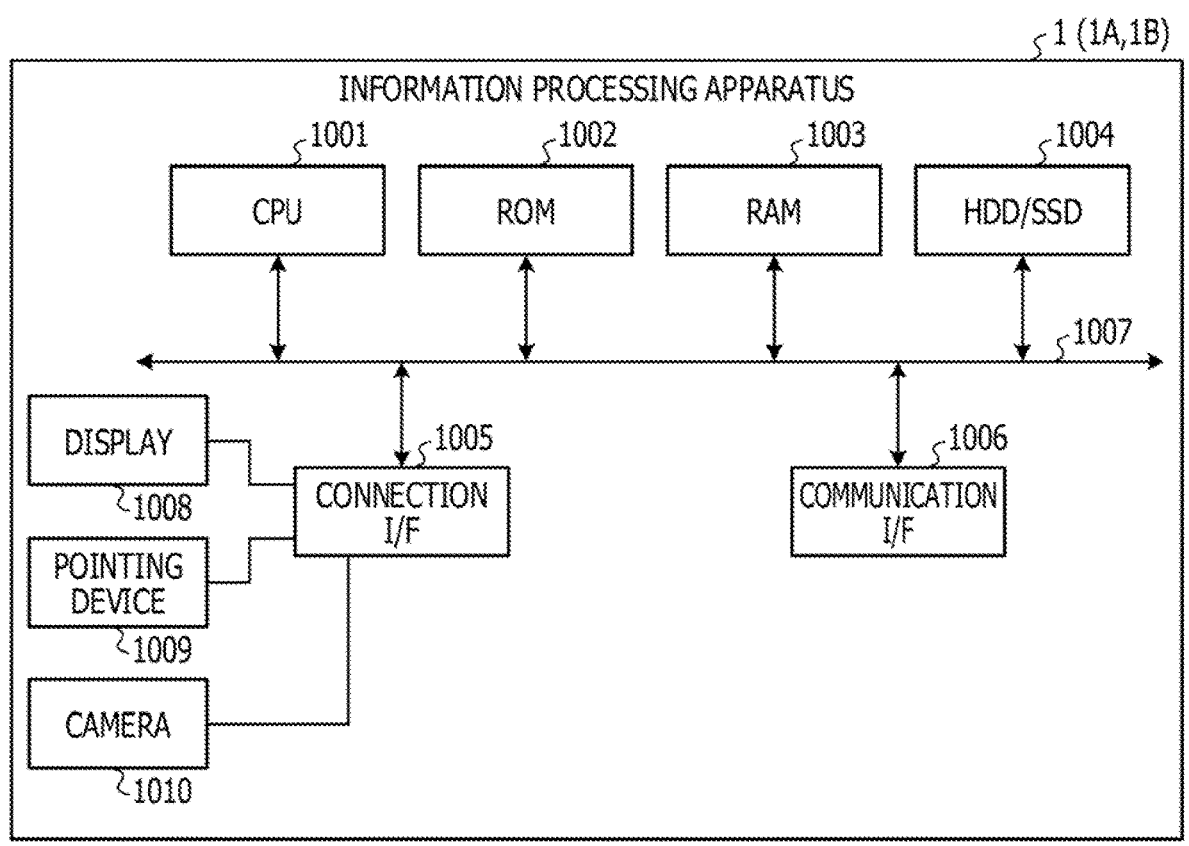
FIG. 15 is a diagram of an exemplary hardware configuration of the information processing apparatus.

FIG. 15 is a diagram of an exemplary hardware configuration of the information processing apparatus 1 (1A, 1B). In FIG. 15, the information processing apparatus 1 includes: a central processing unit (CPU) 1001; a read only memory (ROM) 1002; a random access memory (RAM) 1003; and a hard disk drive (HDD)/solid state drive (SSD) 1004 that are mutually coupled through a bus 1007. Furthermore, the information processing apparatus 1 includes a connection interface (I/F) 1005 and a communication I/F 1006, and a display 1008; a pointing device 1009; and a camera 1010 that are coupled to the connection I/F 1005. The display 1008, the pointing device 1009, and the camera 1010 may be integrally formed by the apparatus or externally attached to the apparatus. Furthermore, a plurality of displays 1008 may be provided.

The CPU 1001 centrally controls the operation of the information processing apparatus 1 by executing a program stored in the ROM 1002, the HDD/SSD 1004, or the like, with the RAM 1003 as a work area. The functions of the information processing apparatus 1 described with reference to FIG. 6 are achieved by the CPU 1001 executing a predetermined program. The program may be acquired through a recording medium, may be acquired through a network, or may be installed in the ROM.

<Operation>

Figure 16:
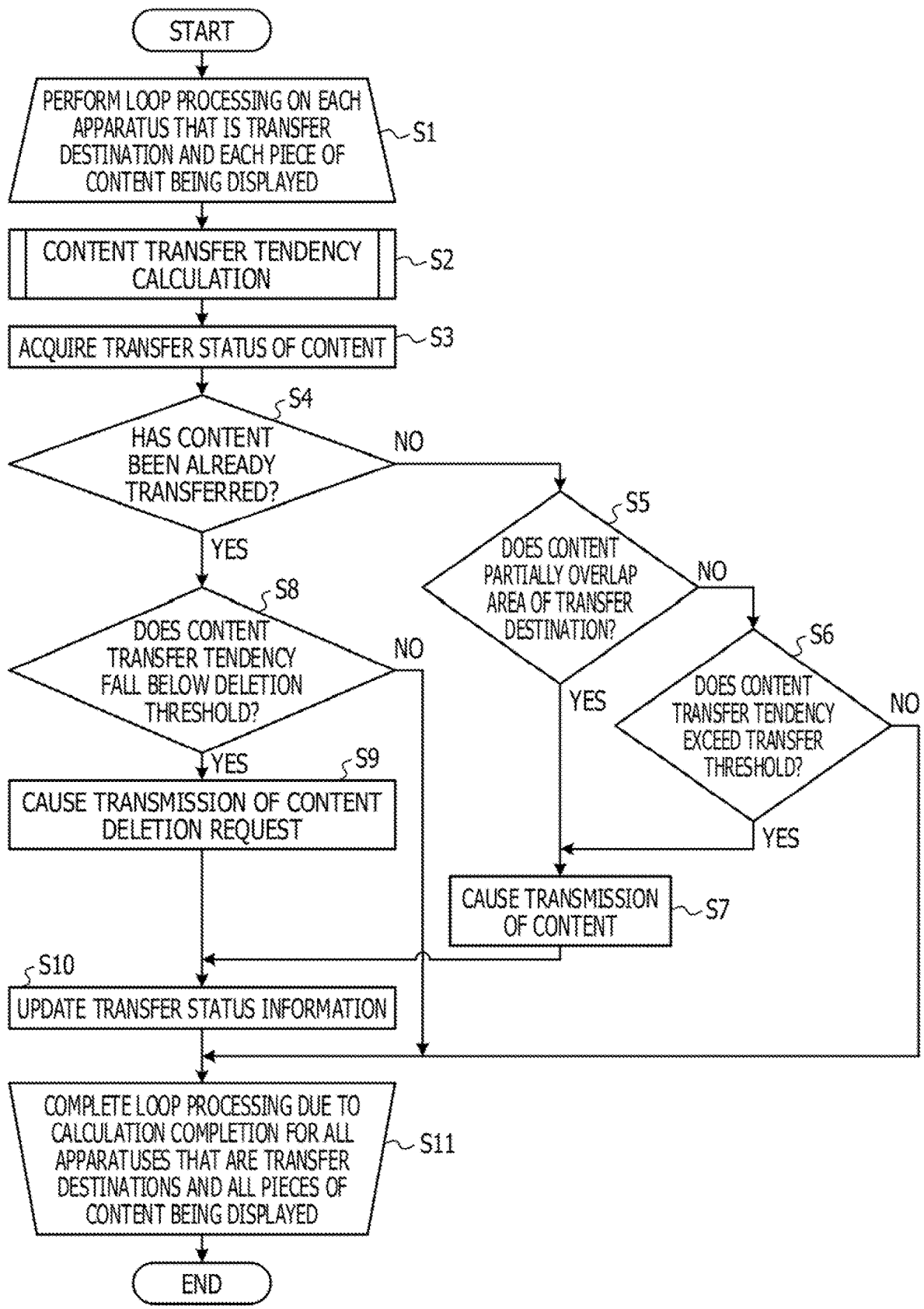
FIG. 16 is a flowchart of exemplary processing by a content transfer determination unit.

FIG. 16 is a flowchart of exemplary processing by the content transfer determination unit 118. In FIG. 16, the content transfer determination unit 118 performs loop processing below on each apparatus that is a transfer destination and each piece of content being displayed (steps S1 to S11).

In the loop processing, the content transfer determination unit 118 calculates a content transfer tendency (step S2). The details of the processing will be described later.

Next, the content transfer determination unit 118 refers to the transfer status information 119 to acquire a transfer status of content (step S3).

Then, the content transfer determination unit 118 determines whether the content has been already transferred (step S4). In a case where it is determined that the content has not yet been transferred (NO in step S4), the content transfer determination unit 118 determines whether the content partially overlaps the area of the transfer destination (step S5).

In a case where the content transfer determination unit 118 determines that the content does not partially overlap the area of the transfer destination (NO in step S5), the content transfer determination unit 118 determines whether the previously calculated content transfer tendency exceeds a predetermined transfer threshold (step S6).

Then, in a case where the content transfer determination unit 118 determines that:
the content partially overlaps the area of the transfer destination (YES in step S5); or
the content transfer tendency exceeds the predetermined transfer threshold (YES in step S6), the content transfer determination unit 118 causes the shared information transmission/reception unit 112 to transmit (transfer) information on the corresponding content (step S7). In a case where it is determined that the content partially overlaps the area of the transfer destination and the content is transferred, the content is actually moving beyond a device (display). Thus, the device of the transfer destination that has received the information on the content immediately displays the transferred content.

Furthermore, in a case where the content transfer determination unit 118 determines that the content has been already transferred (YES in step S4), the content transfer determination unit 118 determines whether the content transfer tendency falls below a predetermined deletion threshold (step S8). For example, for content that has been transferred at a time when the content has not yet moved actually, the content transfer determination unit 118 determines whether the state of transfer is to be maintained subsequently.

In a case where the content transfer determination unit 118 determines that the content transfer tendency falls below the predetermined deletion threshold (YES in step S8), the content transfer determination unit 118 causes the shared information transmission/reception unit 112 to transmit a content deletion request to the apparatus that is the transfer destination (step S9). The apparatus received the content deletion request deletes information on the corresponding content.

The content transfer determination unit 118 updates the transfer status information 119 (step S10) after the transmission of the content (step S7) or the transmission of the content deletion request (step S9).

The content transfer determination unit 118 performs determination for the next loop processing (step S11), in a case where the content transfer determination unit 118 determines that:

the content transfer tendency does not exceed the predetermined transfer threshold (NO in step S6); or the content transfer tendency does not fall below the predetermined deletion threshold (NO in step S8), or after the update of the transfer status information 119 (step S10).

For example, in a case were calculation has not been completed for all apparatuses that are the transfer destinations and all pieces of content being displayed, the loop processing is repeated; and in a case where the calculation is completed, the processing ends.

Figure 17:
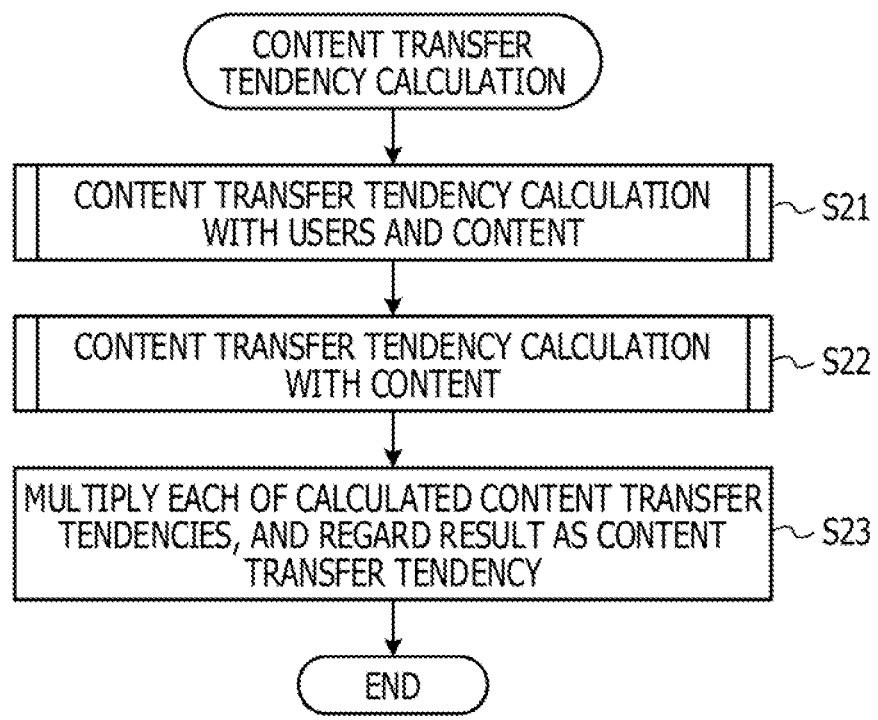
FIG. 17 is a flowchart of exemplary processing of content transfer tendency calculation.

FIG. 17 is a flowchart of exemplary processing of the content transfer tendency calculation (step S2 in FIG. 16). In FIG. 17, the content transfer determination unit 118 calculates content transfer tendencies with the users and the content (step S21). The details of the processing will be described later.

Next, the content transfer determination unit 118 calculates content transfer tendencies with the content (step S22). The details of the processing will be described later.

Next, the content transfer determination unit 118 multiplies (performs multiplication of) each of the calculated content transfer tendencies to regard the result as the overall content transfer tendency (step S23), and ends the processing.

Note that the overall content transfer tendency may be obtained not only with the case of multiplying (performing multiplication) but also by adding (performing addition). Furthermore, the value may be standardized.

Figure 18A:
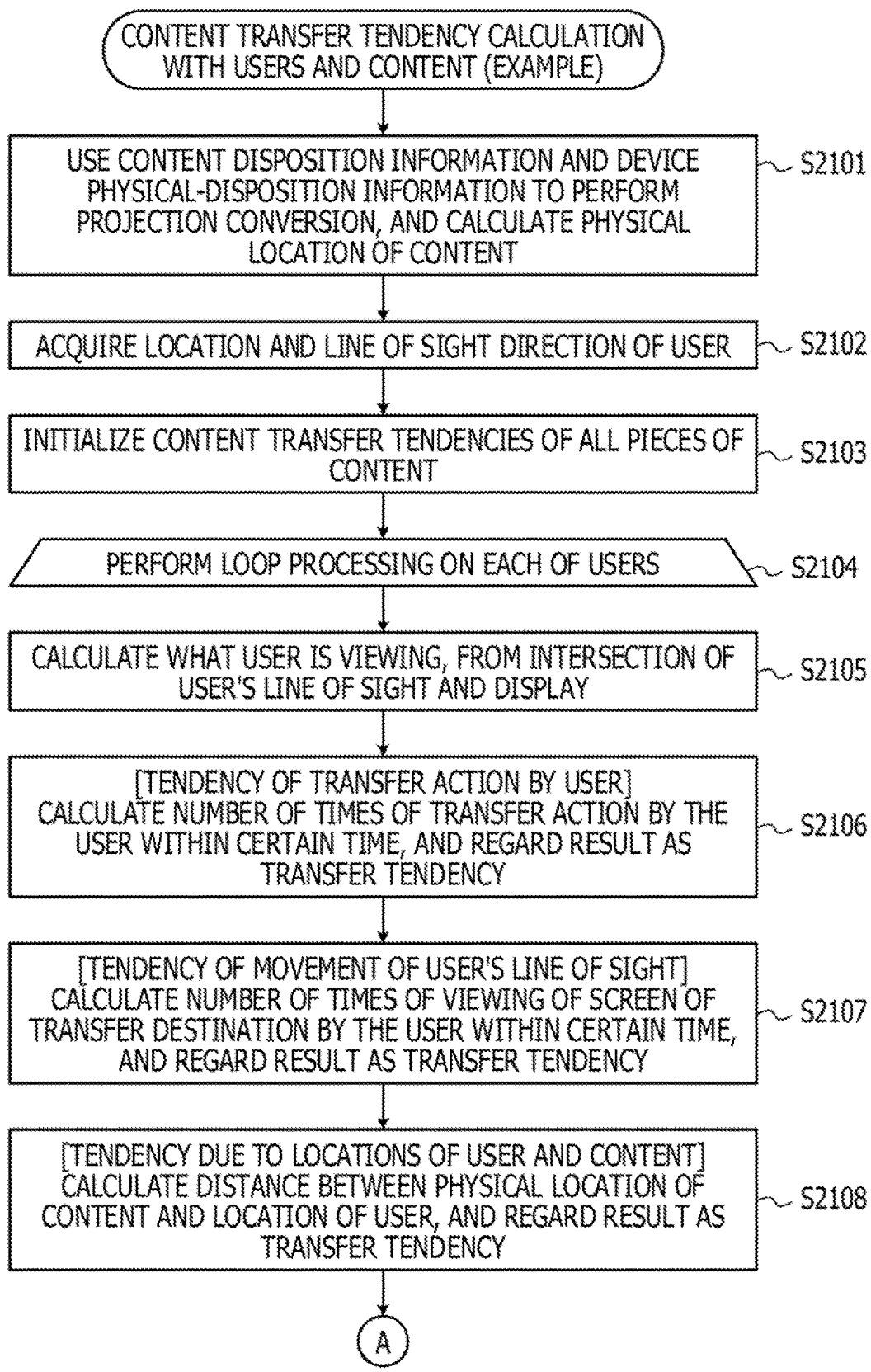
FIGS. 18A and 18B are a flowchart of exemplary processing of content transfer tendency calculation with users and content.
Figure 18B:
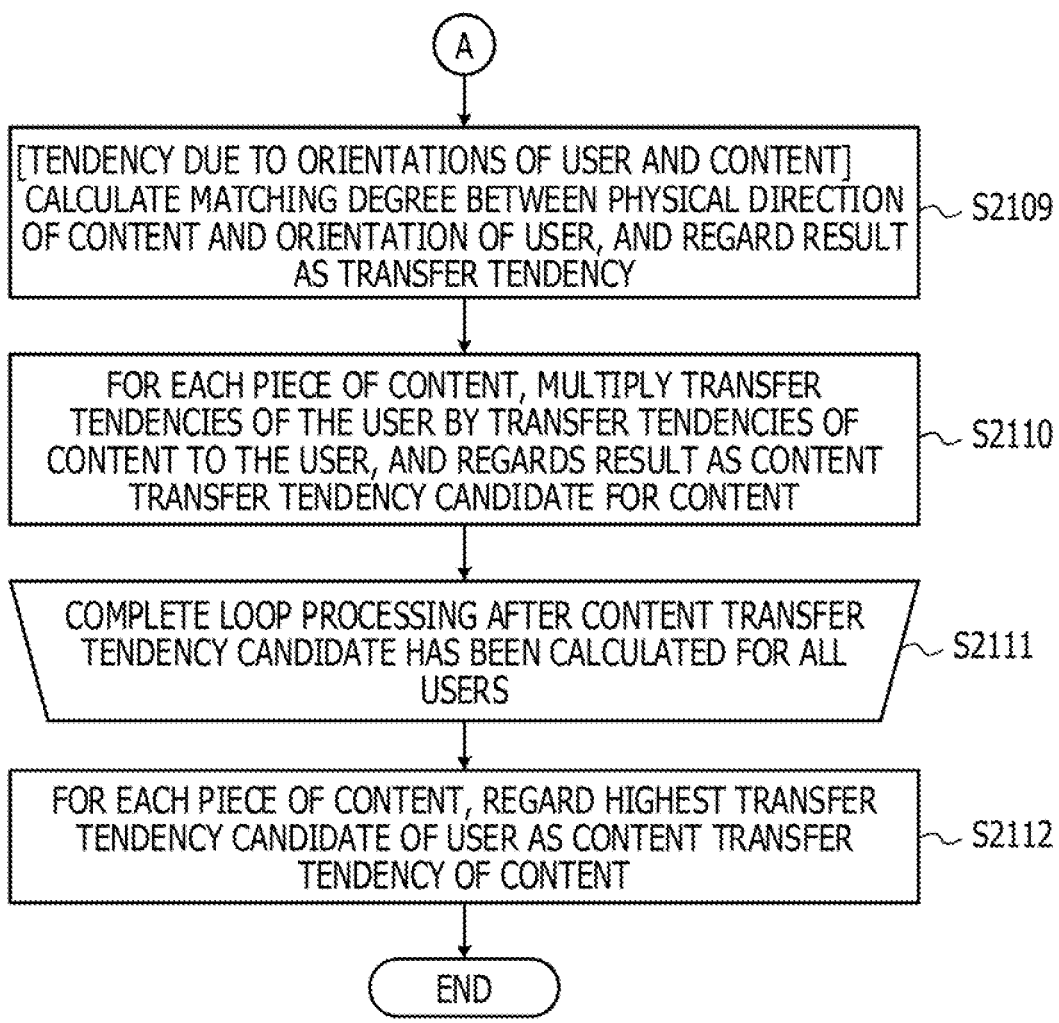

FIGS. 18A and 18B are a flowchart of exemplary processing of the content transfer tendency calculation (step S21 in FIG. 17) with the users and the content. Note that part of the viewpoints of the transfer tendency due to the users and the content described above is used.

In FIGS. 18A and 18B, the content transfer determination unit 118 uses content disposition information and device physical-disposition information acquired from the content disposition detection unit 115 to perform projection conversion, and calculates the physical location of the content (step S2101).

Next, the content transfer determination unit 118 acquires the location and line of sight direction of a user from the user physical-location and action detection unit 116 (step S2102).

Next, the content transfer determination unit 118 initializes the content transfer tendencies of all pieces of content (step S2103).

Next, the content transfer determination unit 118 performs loop processing below on each of the users (steps S2104 to S2111).

In the loop processing, the content transfer determination unit 118 calculates what the user is viewing, from the intersection of the user's line of sight and a display (step S2105).

Next, the content transfer determination unit 118 refers to the transfer history information 120 as a tendency of transfer action by the user, calculates the number of times of transfer action (transfer operation) by the user within a certain period of time, and regards the result as a transfer tendency (step S2106).

Next, the content transfer determination unit 118 calculates, as a tendency of movement of the user's line of sight, the number of times of viewing of the screen of a transfer destination (screen of the other party at a video conference) by the user within a certain time, and regards the result as a transfer tendency (step S2107).

Next, the content transfer determination unit 118 calculates, as a tendency due to the location of the content, the distance between the physical location of the content and the location of the user, and regards the result as a transfer tendency (step S2108).

Next, the content transfer determination unit 118 calculates, as a tendency due to the orientation of the content, the matching degree between a physical direction of the content and the orientation of the user, and regards the result as a transfer tendency (step S2109).

Next, for each piece of content, the content transfer determination unit 118 multiplies the transfer tendencies of the user by the transfer tendencies of the content to the user, and regards the result as a content transfer tendency candidate for the content (step S2110).

Next, the content transfer determination unit 118 repeats the loop processing on the next target in a case where the content transfer tendency candidate has not been calculated for all users, and completes the loop processing in a case where the calculation is completed (step S2111).

In a case where the loop processing is completed, the content transfer determination unit 118 regards, for each piece of content, the highest content transfer tendency candidate of the user as the content transfer tendency of the content (step S2112).

Note that the content transfer tendency candidate may be obtained not only with the case of multiplying (performing multiplication) but also by adding (performing addition). Furthermore, the value may be standardized.

FIG. 19 is a flowchart of exemplary processing of the content transfer tendency calculation (step S22 in FIG. 17) with the content. Note that part of the viewpoints of the transfer tendency due to the content described above is used.

In FIG. 19, the content transfer determination unit 118 performs loop processing below on each piece of content (steps S221 to S226).

In the loop processing, the content transfer determination unit 118 calculates, as a tendency due to an operation, the input frequency to the content within a certain time, and regards the result as a transfer tendency (step S222).

Next, the content transfer determination unit 118 calculates, as a tendency due to a contact face distance, the distance from a connection face of a display, and regards the result as a transfer tendency (step S223).

Next, the content transfer determination unit 118 acquires, as a tendency due to similarity with a transfer destination, similarity with content already transferred, from the content similarity calculation unit 117, and regards the acquired similarity as a transfer tendency (step S224).

Next, the content transfer determination unit 118 multiplies the transfer tendencies calculated with the respective techniques, and regards the result as the content transfer tendency of the content (step S225).

Note that the content transfer tendency may be obtained not only with the case of multiplying (performing multiplication) but also by adding (performing addition). Furthermore, the value may be standardized.

Next, the content transfer determination unit 118 repeats the loop processing on the next target in a case where the content transfer tendency has not been calculated for all pieces of content, completes the loop processing in a case where the calculation is completed (step S226), and ends the processing of transfer tendency calculation with the content.

<Modification>

FIGS. 5 and 6 illustrate the case where the plurality of information processing apparatuses 1 (1A, 1B) having an equal relationship are coupled. However, in addition to the information processing apparatuses 1, a common server such as a cloud may be provided. In this case, a content transfer tendency is calculated on the server, and content determined to have the possibility of transfer is transferred in advance to an information processing apparatus that is a transfer destination.

CONCLUSION

As described above, according to the present embodiment, there can be improved the operability of content movement in the case where the plurality of screens under management of the plurality of apparatuses forms the single logical screen. For example, not only transfer of content is performed after an operation by the user, but also content with high possibility of transfer is estimated and transferred in advance. As a result, waiting time at transfer is reduced to improve the operability.

Hereinabove, the preferred embodiment has been described. Although the preferred embodiment has been described with the specific examples indicated herein, it will be apparent that various modifications and changes can be added to the specific examples, without departing from the broad gist and scope defined in the claims. That is, it should not be interpreted as being limited by the details of the specific examples and the accompanying drawings.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
display content which is included in information on the content retained in the memory of the information processing apparatus and is identified by a content identifier;
determine, by calculating a transfer tendency indicating a possibility of transfer from the information processing apparatus to another apparatus for the content which is displayed at the information processing apparatus and comparing the transfer tendency with a threshold, a degree of the possibility, the transfer tendency being obtained by multiplying or adding a first transfer tendency and a second transfer tendency;
transfer the information on the content to the another apparatus that is a transfer destination, when determining that the transfer tendency exceeds the threshold;
calculate a physical location of the content using content disposition information indicating a location of the content on a display and device physical-disposition configuration information indicating a location of the display;
obtain a location and a line of sight direction of a user;
calculate a first number of times of transfer operation by the user within a period of time;
calculate a second number of times of viewing of a screen of the transfer destination by the user within the period of time;
calculate a first distance between the physical location of the content and the location of the user;
calculate a matching degree between a physical direction of the content and the line of sight direction of the user;
calculate the first transfer tendency by multiplying or adding the first number, the second number, the first distance and the matching degree;
calculate an input frequency to the content within a period of time;
calculate a second distance between the content and a screen connection side of the display;
calculate similarity between the content and already transferred content; and
calculate the second transfer tendency by multiplying or adding the input frequency, the second distance and the similarity.

2. The information processing apparatus according to claim 1, wherein the processor is configured to transmit a content information deletion request for an already transferred content when determining that the transfer tendency is less than a deletion threshold.

3. An information processing system comprising:
a first apparatus including a memory and a processor; and
a second apparatus,
wherein the processor is configured to:
display content which is included in information on the content retained in the memory of the first apparatus and is identified by a content identifier;
determine, by calculating a transfer tendency indicating a possibility of transfer from the first apparatus to the second apparatus for the content which is displayed at the first apparatus and comparing the transfer tendency with a threshold, a degree of the possibility, the transfer tendency being obtained by multiplying or adding a first transfer tendency and a second transfer tendency;
transfer the information on the content to the second apparatus that is a transfer destination, in a case where the processor determines that the transfer tendency exceeds the threshold;
calculate a physical location of the content using content disposition information indicating a location of the content on a display and device physical-disposition configuration information indicating a location of the display;
obtain a location and a line of sight direction of a user;
calculate a first number of times of transfer operation by the user within a period of time;
calculate a second number of times of viewing of a screen of the transfer destination by the user within the period of time;
calculate a first distance between the physical location of the content and the location of the user;
calculate a matching degree between a physical direction of the content and the line of sight direction of the user;

calculate the first transfer tendency by multiplying or adding the first number, the second number, the first distance and the matching degree;

calculate an input frequency to the content within a period of time;

calculate a second distance between the content and a screen connection side of the display;

calculate similarity between the content and already transferred content; and calculate the second transfer tendency by multiplying or adding the input frequency, the second distance and the similarity.

4. The information processing system according to claim 3, wherein the professor transmits a content information deletion request for an already transferred content when determining that the transfer tendency is less than a deletion threshold.

5. An information processing method of causing a computer to execute processing of:

displaying content which is included in information on the content retained in a memory of a first apparatus and is identified by a content identifier;

determining, by calculating a transfer tendency indicating a possibility of transfer from the first apparatus to a second apparatus for the content which is displayed at the first apparatus and comparing the transfer tendency with a threshold, a degree of the possibility, the transfer tendency being obtained by multiplying or adding a first transfer tendency and a second transfer tendency;

transferring the information on the content to the second apparatus that is a transfer destination, in a case where the determining determines that the transfer tendency exceeds the threshold;

calculating a physical location of the content using content disposition information indicating a location of the content on a display and device physical-disposition configuration information indicating a location of the display;

obtaining a location and a line of sight direction of a user;

calculating a first number of times of transfer operation by the user within a period of time;

calculating a second number of times of viewing of a screen of the transfer destination by the user within the period of time;

calculating a first distance between the physical location of the content and the location of the user;

calculating a matching degree between a physical direction of the content and the line of sight direction of the user;

calculating the first transfer tendency by multiplying or adding the first number, the second number, the first distance and the matching degree;

calculating an input frequency to the content within a period of time;

calculating a second distance between the content and a screen connection side of the display;

calculating similarity between the content and already transferred content; and calculating the second transfer tendency by multiplying or adding the input frequency, the second distance and the similarity.

6. The information processing method according to claim 5, wherein the transferring includes transmitting a content information deletion request for an already transferred content when determining that the transfer tendency is less than a deletion threshold.

* * * * *